Patented Nov. 10, 1936

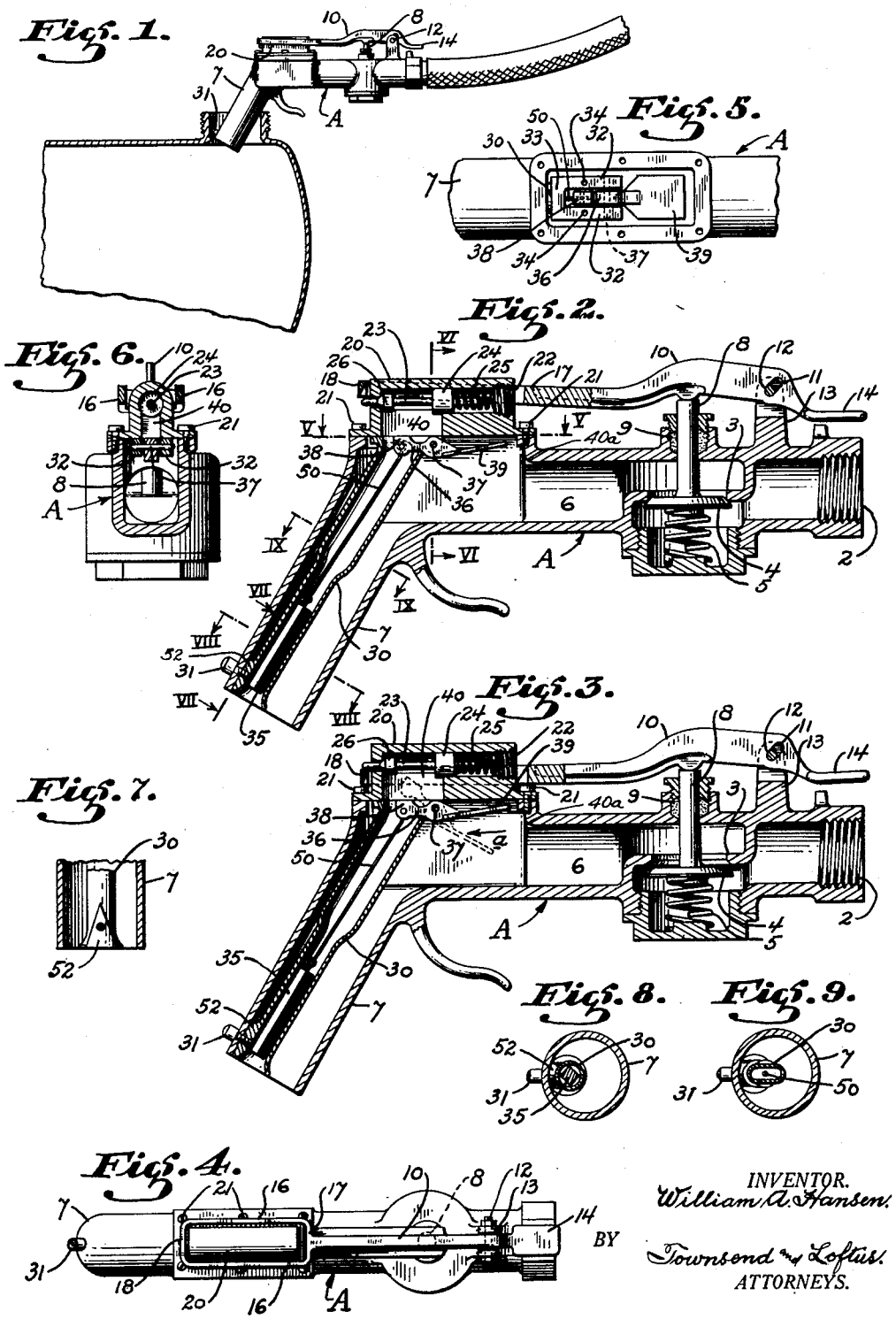

2,060,570

UNITED STATES PATENT OFFICE 2,060,570

AUTOMATIC SHUT-OFF FOR FILLING SPOUTS

William A. Hansen, Dos Palos, Calif.

Application April 29, 1933, Serial No. 668,485

21 Claims. (Cl. 226—127)

This invention relates to a filling spout such as used on the end of a hose; for instance, in gasolene service stations, or the like, and especially to means for automatically closing or shutting off the flow of liquid through the spout when a predetermined liquid level is reached in the tank or other container to be filled; the present invention being an improved or modified form of the structure shown in my co-pending application entitled "Automatic shut-off for filling spouts", filed September 22, 1930, Serial Number 483,521. The co-pending application referred to discloses a valve housing adapted to be attached to the end of a hose line and to function as a filling spout. The housing contains two valves, a main shut-off valve and an automatic valve. The main shut-off valve is adapted to be opened and closed by manual means only, while the automatic valve is actuated by a float so that when a predetermined liquid level is obtained the float rises and closes the automatic valve, thereby shutting off further flow of liquid through the spout. The automatic valve functions only as a temporary shut-off and as a warning device for the operator; that is, the automatic valve closes with an impact action and as such warns the operator, as the impact can be both heard and felt, and when the operator is warned he is supposed to manually close the main shut-off valve.

The present invention embodies a housing terminating in a filling spout and it is provided with a main shut-off valve but the automatic valve is entirely eliminated. The main valve is adapted to be manually opened and closed, and in addition thereto, to be automatically closed. The manual and automatic operation of the main shut-off valve, together with the mechanism for actuating the same, forms the subject matter of the present invention and will be described in detail in the accompanying specification.

The improved shut-off valve and filling spout is shown by way of illustration in the accompanying drawing, in which—

Fig. 1 is a partial sectional view of a gasolene tank showing the filling spout in position to fill the tank.

Fig. 2 is an enlarged vertical longitudinal section through the automatic shut-off and filling spout, said view showing the main shut-off valve in closed position.

Fig. 3 is a view similar to Fig. 2, showing the main shut-off valve in open position.

Fig. 4 is an enlarged plan view of the valve shown in Fig. 1.

Fig. 5 is a plan view of a portion of the valve, the view being taken on line V—V of Fig. 2.

Fig. 6 is a vertical cross section taken on line VI—VI of Fig. 2.

Fig. 7 is a section taken on line VII—VII of Fig. 2.

Fig. 8 is a cross section taken on line VIII—VIII of Fig. 2.

Fig. 9 is a cross section taken on line IX—IX of Fig. 2.

Referring to the drawing in detail, particularly Figs. 1, 2 and 3, A indicates a tubular elongated housing which is adapted to be connected with a hose line through a threaded connection, such as indicated at 2, formed in the housing of a valve seat 3 and normally engaging said seat is a valve 4; the valve being held in closed position by means of a spring 5. Liquid entering through the connection 2 passes by the valve when it is open and upwardly through the valve seat and it then enters a chamber 6 which communicates with an extension of the housing, said extension forming a filling spout as generally indicated at 7. The liquid passing by the valve and entering the chamber 6 will thus discharge through the spout and from the spout may enter a tank, or any other container, to be filled, see for instance Fig. 1.

One of the important features of the present invention is to provide a main shut-off valve, such as indicated at 4, which is adapted to be manually opened and closed and also to be automatically closed. This is accomplished as follows: Valve 4 is provided with a stem 8 which extends through a stuffing box, or the like, indicated at 9. Engageable with the upper end of the valve stem is a lever 10. Formed in the lever is an inclined or angularly disposed slot 11, and extending therethrough is a pin 12, the pin being supported by a pair of lugs 13 and said lugs in turn forming a guide for one end of the lever 10. The lever terminates at a point adjacent the slot 12 in a finger or presser plate 14, the function of which will hereinafter be described. The opposite end of the lever terminates in a yoke consisting of side members 16—16, see Fig. 4, and end members 17 and 18; the side members 16—16 and the end members 17 and 18 and the lever 10 being preferably formed as an integral piece. The yoke is formed to straddle a housing generally indicated at 20. This housing is rectangular in shape, as shown, and secured to the main housing A by means of screws 21. Formed within the housing 20 is a cylindrical chamber which is closed at one end by means of a screw plug 22. Slidably mounted in the cylindrical chamber is a pin 23, said pin being guided by a collar 24 and being held in the position shown in Fig. 2 by means of a spring 25 interposed between the collar and the screw plug. The stem 23 projects through the end of the housing opposite the screw plug and is provided with a valve-like member 26 to reduce leakage, as will hereinafter be described. The stem 23, that is, the end which projects through the housing functions as a spring actuated latch as its only function is that of engaging the cross member 18 of the yoke so as to hold the lever 10 in the depressed position shown in Fig. 3, and thereby maintain the main shut-off valve 4 in open position.

When the lever 10 has been moved to depressed position and secured by means of the latch or detent 23, it may be either manually released or automatically released, and when it is released, it swings upwardly above the pin 12 and will assume the position shown in Fig. 2; the lever being pushed upwardly into this position by means of the spring 5 under the shut-off valve. Hence, when the lever is raised by means of the spring 5, valve 4 will close and further flow of liquid through the housing and spout will be prevented. Manual release of the lever 10 to permit closing of the valve 4 is accomplished by applying pressure to the end 14 of the lever. Downward pressure applied by the thumb, or otherwise, causes the lever to slide downwardly on the pin 12, and as the slot 11 is inclined, the lever will be simultaneously moved in a forward direction. During such forward movement it clears the end of the detent or latch pin 23, and when it is clear, the lever will swing upwardly due to the pressure of the spring 5 and the valve will close. Hence, it is possible to manually close the valve at any time desired.

Automatic release of the valve lever 10 and closing of the valve 4 may also be accomplished, but before the operation is described, certain mechanism employed must be explained. By referring to Figs. 2, 3, 5, 6, 7, 8 and 9, it will be noticed that a tubular member 30 extends downwardly through the filling spout 7 and that the tubular member is secured to the lower end of the spout by means of a screw 31. The upper end of the tube presents a flat surface and this surface is substantially U-shaped, see the sides 32 in Fig. 5, and the end portion 33. The flat surface presented by the upper end of the tube engages the flat under surface of the auxiliary housing 20 and the upper end of the tube is secured to the underside of the housing 20 by means of a pair of screws 34. The tube 30 acts as a support and guide for a weight, indicated at 35, and it also functions as a support and a guide for a trip lever 36. This lever is pivoted on the pin 37 extending through the upper end of the tube. The trip lever carries a tripping head 38 at one end and it carries a vane or plate 39 at the opposite end. The auxiliary housing 20 has an elongated slot 40 formed therein in which the trip head may operate while the vane or plate 39 is free to move in the main housing A. The trip lever 36 is fitted loosely between the side members 32 and the end member 33 at the upper end of the tube 30, and this is desirable as a leakage or rather a suction passage between the interior of the housing A and the upper end of the tube 30 is desired.

The operation of the automatic closing of the main shut off valve will now be described. Supposing a tank is to be filled with a liquid, as shown in Fig. 1. If that is the case, the filling spout is inserted in the upper end of the tank as there disclosed, lever 10 is then pushed downwardly until the forward cross bar 18 is engaged by the detent or latch pin 23. In this position the lever is locked against movement and valve 4 will be opened. The liquid will thus freely flow through the housing A and the spout and discharge into the tank, and as it flows through the housing it passes a shoulder 40A and strikes the under surface of the vane or plate 39 and is deflected thereby downwardly through the spout 7. The eddy currents produced by the liquid passing the shoulder and deflected downwardly through the spout by striking the plate produces a slight suction at the ends of the plate and at the upper end of the tube 30, hence a small amount of air is continuously passing upwardly through the tube and the suction passage; the suction passage being the spaces formed between the sides 32 at the upper end of the housing and the trip lever. As previously described, the free play between the trip lever and the side members 32 provides sufficient passage to form the suction passage desired. The air rushing upwardly through the tube 30 and passing by the trip lever and back into the housing A might be said to circulate around and around but when the liquid level in the tank finally reaches the end of the spout, liquid will be drawn upwardly through the tube 30 and as the liquid will travel with considerable velocity it will force the weight 35 upwardly and as this is connected with the trip end of the head 38 of the trip lever through means of a link 50, it will swing the trip lever about its pivot or pin 37, causing it to assume the dotted line position shown in Fig. 3, and when it assumes this position it receives the full impact of the liquid flowing in the direction of arrow a; that is, the vane end of the trip lever receives the full force of impact of the liquid and it thus swings the trip lever to a vertical position where the head end strikes the collar 24, and when this is struck, the detent or latch pin 23 is retracted and the lever 10 is released, thus permitting an immediate closing of the shut-off valve 4. The only reason for employing the weight 35 is that of normally maintaining the vane or plate 39 in the raised position shown in Figs. 2 and 3, and as this is the only function of the weight 35 it is obvious that the head or trip end 38 might be weighted to serve the same function. The liquid rising upwardly through the tube when the tank is filling would impact with the trip head just as well as it would with the weight, hence the weight may be placed wherever it is most convenient; the only function of the liquid being to impart initial movement to the trip lever as the remaining or actuating movement is imparted by the head impacting or striking the vane 39.

By referring to Figs. 3 and 7, it will be noted that a triangular-shaped lug 52 is formed at the lower end of the tube 30 to receive the securing screw 31. This lug serves two functions; First, that of a support for the securing screw 31, and secondly as a deflector or divider to divide the stream of liquid discharging through the spout. By dividing it, it leaves an air space through which air can freely enter the lower end of the tube 30, this being important as no liquid must enter the tube 30 until the tank is filled, or a predetermined liquid level is reached, the predetermined liquid level depending upon the distance the spout is inserted in the tank. A comparatively short spout is here shown but obviously a spout of any length can be employed.

In view of the foregoing it will be noted that a filling spout has been provided which embodies a main shut-off valve. This valve may be manually opened and closed whenever desired, and it may also be automatically closed. This latter feature is exceedingly important as it leaves the operator free to attend to other duties while a tank is being filled, hence danger of the tank overflowing and the fire hazard in connection therewith is entirely eliminated. While the device has been described in conjunction with gasolene service stations, it is obvious that it may be used for filling barrels, tanks, and other containers; and while certain features of the invention are more or less specifically described, I wish it understood that various changes may be resorted to within the scope of the appended claims. Similarly, that the materials and finish of the several parts employed may be such as the manufacturer may decide, or varying conditions or uses may demand.

Having thus described my invention, what I claim and desire to secure by Letters Patent is—

1. A device of the character described comprising a housing terminating in a filling spout, said spout being insertable through the filling opening of a container to be filled, a shut-off valve in the housing, means for manually opening and closing said valve, a tube within the spout, the upper end of the tube being in communication with a space in the housing which is partially evacuated by liquid flowing through the housing and spout, said partial evacuation adapted to pull liquid upwardly through the tube when the liquid level in the container reaches the discharge end of the spout, and a movable member in the tube actuated by the liquid flowing through the tube for automatically closing the valve.

2. A device of the character described comprising a housing terminating in a filling spout, a spring closed shut-off valve in the housing, said valve having a stem projected through the housing, a lever pivotally mounted on the housing, said lever when manually depressed engaging the stem and opening the valve, a latch engageable with the lever to secure it in depressed position, and means for imparting longitudinal movement to the lever to release it with relation to the latch.

3. A device of the character described comprising a housing terminating in a filling spout, a spring closed shut-off valve in the housing, said valve having a stem projected through the housing, a lever pivotally mounted on the housing, said lever when manually depressed engaging the stem and opening the valve, a latch engageable with the lever to secure it in depressed position, means for imparting longitudinal movement to the lever to release it with relation to the latch, and means for retracting the latch to release the lever.

4. A device of the character described comprising a housing terminating in a filling spout, said spout being insertable in the filling opening of a container to be filled, a spring closed shut-off valve in the housing, said valve having a stem projecting through the housing, a lever pivotally mounted on the housing, said lever when manually depressed engaging the stem and opening the valve, a latch engageable with the lever to secure it in depressed position, a tube extending substantially from end to end of the spout, the upper end of the tube being in communication with a space in the housing which is partially evacuated by liquid flowing through the housing and spout, said partial evacuation adapted to pull liquid through the tube when the liquid level in the container reaches the discharge end of the spout, a trip lever pivotally mounted adjacent the upper end of the tube, said lever carrying a vane on one end and being weighted on the other end, said weighted end normally maintaining the vane in an elevated position and out of the path of flow of liquid passing through the housing and spout, said weight adapted to be engaged by liquid passing through the tube and adapted to impart a rocking movement to the trip lever about its pivot by impact of such liquid on the weight, and when rocked, projecting the vane into the path of flow of liquid passing through the housing and spout, and when the vane is so projected further rocking movement is imparted to the trip lever by the force of the liquid against the vane, and means actuated by the movement of the trip lever when under the influence of the flowing liquid in the housing and spout for withdrawing the latch to release the lever so as to permit the shut-off valve to close.

5. A device of the character described comprising a housing terminating in a filling spout, a spring closed shut-off valve in the housing, said valve having a stem projecting through the housing, a lever pivotally mounted on the housing, said lever when manually depressed engaging the stem and opening the valve, a latch engageable with the lever to secure it in depressed position, means for imparting longitudinal movement to the lever to release it with relation to the latch, and automatically actuated means for retracting the latch to release the lever.

6. A device of the character described comprising a housing terminating in a filling spout, a spring closed shut-off valve in the housing, said valve having a stem projecting through the housing, a lever pivotally mounted on the housing, said lever when manually depressed engaging the stem and opening the valve, a latch engageable with the lever to secure it in depressed position, means for imparting longitudinal movement to the lever to release it with relation to the latch, and means actuated by impact of liquid flowing through the housing for retracting the latch to release the lever.

7. A device of the character described comprising a housing terminating in a filling spout, a shut-off valve in the housing, said valve being normally held in closed position by a spring, a stem on the valve projecting through the housing, a lever pivotally mounted on the housing and engageable with the stem, said lever adapted to be manually depressed to move the valve into open position, a latch engageable with the lever to retain the same in depressed position, a trip lever pivotally mounted in the housing for retracting the latch, a vane carried by the trip lever and normally held in a position out of the path of liquid flowing through the valve and housing, and means for imparting movement to the trip lever about its pivot to swing the vane into the path of the liquid flowing through the valve and the housing so that the force of the liquid impinging on the vane will swing the vane and the trip lever to engage and retract the latch, and thereby permit closing of the valve.

8. A device of the character described comprising a housing terminating in a filling spout, said spout being insertable through the filling opening of a container to be filled, a shut-off valve in the housing, means for manually opening and closing said valve, a tube within the spout, the upper end of the tube being in communication with a space in the housing which is partially evacuated by liquid flowing through the housing and spout, said partial evacuation adapted to pull liquid upwardly through the tube when the liquid level in the container reaches the discharge end of the spout, a vane pivotally mounted in the housing and normally held in a position out of the path of liquid flowing through the valve and the housing, means actuated by the liquid flowing through the tube for swinging the vane about its pivot and into the path of the liquid flowing through the valve and the housing, and means actuated by the pivotal movement of the vane for automatically closing the valve.

9. A device of the character described comprising a housing terminating in a filling spout, said spout being insertable through the filling opening of a container to be filled, a shut-off valve in the housing, means for manually opening and closing said valve, a tube within the spout, the upper end of the tube being in communication with a space in the housing which is partially evacuated by liquid flowing through the housing and spout, said partial evacuation being sufficient to cause air to flow upwardly through the tube and said air flow pulling liquid upwardly through the tube when the liquid level in the container reaches the discharge end of the spout, a V-shaped lug on the lower end of the tube to divide a portion of the stream of liquid discharging from the end of the spout so that air may freely enter the lower end of the tube, a vane pivotally mounted in the housing and normally held in a position out of the path of liquid flowing through the valve and the housing, means actuated by the liquid flowing through the tube for swinging the vane about its pivot and into the path of the liquid flowing through the valve and the housing, and means actuated by the pivotal movement of the vane for automatically closing the valve.

10. A device of the character described comprising a housing terminating in a filling spout, a spring closed shut-off valve in the housing, said valve having a stem projecting through the housing, a lever pivotally mounted in the housing, said lever when manually depressed engaging the stem and opening the valve, a rod within the housing and slidably mounted to move longitudinally thereof, one end of the rod projecting through the housing and forming a latch engageable with the free end of the lever to secure the lever in depressed position, a valve member on the rod engaging the inner face of the housing to prevent leakage around the projected end of the rod, means normally holding the latch end of the rod in projected position and the valve in engagement with the inner face of the housing, and means for retracting the latch to release the lever.

11. A device of the character described comprising a housing terminating in a filling spout, said spout being insertable through the filling opening of a container to be filled, a shut-off valve in the housing, means for manually opening and closing said valve, a tube within the spout, the upper end of the tube being in communication with a space in the housing which is partially evacuated by liquid flowing through the housing and spout, said partial evacuation adapted to pull liquid upwardly through the tube when the liquid level in the container reaches the discharge end of the spout, a movable member in the tube actuated by liquid flowing through the tube for automatically closing the valve, and a deflector on the lower end of the tube to partially deflect a portion of the liquid discharging from the spout so as to form a space whereby air can freely enter the lower end of the tube.

12. The combination with a valve for controlling the discharge of liquid from a flow line; of means for releasably retaining the valve open; and means correlated with the first means and including a movably mounted member having portions one of which is adapted to be acted upon by a rising body of liquid to move the other portion into the path of liquid discharging from the flow line for actuation of the member by the discharging liquid in a manner to release the retaining means so as to permit the valve to close.

13. A valve for controlling the discharge of liquid from a flow line and having a spout adapted to be disposed in a receptacle to be supplied with liquid; means for releasably retaining the valve open; and actuating means for releasing the retaining means in order to permit the valve to close; said actuating means including a member movably mounted from the spout and having portions, one of which is adapted to be acted upon by liquid rising in the receptacle, to move the other portion into the path of liquid discharging from the spout for actuation of the member by the discharging liquid to release the retaining means.

14. In an automatic valve, the combination of a conduit for conducting liquid to a receptacle, a valve for stopping the flow of liquid therethrough, means for withdrawing liquid from the receptacle when the desired liquid level therein has been reached, comprising suction means communicating with the interior of the receptacle and actuated by the passage of liquid through said conduit, and means actuated by the liquid withdrawn from the receptacle to close the said valve.

15. A nozzle comprising a valve housing having inlet and outlet connections, a spout leading from the outlet connection and having an auxiliary passage, a valve for controlling flow of liquid through the valve housing from the inlet to the outlet, actuating means for moving the valve to an opened position, means for creating suction inwardly through the auxiliary passage during flow of liquid outwardly through the nozzle, and means for effecting return of the valve to a closed position including an actuating member movably mounted in the auxiliary passage in position to be actuated by impact of liquid sucked into the auxiliary passage when the outer end of the auxiliary passage is immersed in liquid.

16. A nozzle having a liquid passage and an air passage, a normally closed valve for controlling flow of liquid outwardly through the liquid passage, means for moving the valve to an opened position, means for creating suction inwardly through the air passage when the liquid is flowing outwardly through the liquid passage, and means actuated by impact of liquid sucked into the air passage for effecting return of the valve to a closed position.

17. A nozzle having a liquid passage and an air passage, a normally closed valve for controlling flow of liquid outwardly through the liquid passage, means for moving the valve to an opened position, means for creating suction inwardly through the air passage when liquid is flowing outwardly through the liquid passage, and means for effecting return of the valve to a closed position including an actuating member located in the air passage adjacent the outer end thereof in position to be actuated by impact of liquid sucked into the air passage when the outer end of the air passage is immersed in liquid.

18. A nozzle having a discharge spout and an auxiliary passage extending longitudinally of the spout and communicating with the interior of the spout, a normally closed valve for controlling flow of liquid through the nozzle, means for moving the valve to an opened position, means for creating suction through the auxiliary passage when liquid is flowing outwardly through the spout, and means for effecting automatic return of the valve to a closed position having actuating means mounted in the auxiliary passage in position to be operated by impact of liquid sucked into the auxiliary passage when the outer end of the auxiliary passage is immersed in liquid.

19. A nozzle comprising a valve housing having inlet and outlet connections, a spout leading from the outlet connection and having an auxiliary passage, a valve for controlling flow of liquid through the valve housing from the inlet to the outlet, actuating means for moving the valve to an opened position, means for creating suction inwardly through the auxiliary passage during flow of liquid outwardly through the nozzle, and means for effecting return of the valve to a closed position including an actuating member movably mounted in the auxiliary passage in position to be actuated by liquid sucked into the auxiliary passage when the outer end of the auxiliary passage is immersed in liquid.

20. A nozzle having a liquid passage and an air passage, a normally closed valve for controlling flow of liquid outwardly through the liquid passage, means for moving the valve to an opened position, means for creating suction inwardly through the air passage when the liquid is flowing outwardly through the liquid passage, and means actuated by liquid sucked into the air passage for effecting return of the valve to a closed position.

21. A nozzle having a discharge spout and an auxiliary passage extending longitudinally of the spout and communicating with the interior of the spout, a normally closed valve for controlling flow of liquid through the nozzle, means for moving the valve to an opened position, means for creating suction through the auxiliary passage when liquid is flowing outwardly through the spout, and means for effecting automatic return of the valve to a closed position having actuating means mounted in the auxiliary passage in position to be operated by liquid sucked into the auxiliary passage when the outer end of the auxiliary passage is immersed in liquid.

WILLIAM A. HANSEN.